United States Patent
Kerai

(10) Patent No.: US 11,601,792 B1
(45) Date of Patent: Mar. 7, 2023

(54) BLE SYSTEM WITH MULTIPLE TOPOLOGIES AND SLAVE TO SLAVE COMMUNICATION

(71) Applicant: Dialog Semiconductor B.V., s-Hertogenbosch (NL)

(72) Inventor: Kanji Kerai, London (GB)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 284 days.

(21) Appl. No.: 17/107,015

(22) Filed: Nov. 30, 2020

(51) Int. Cl.
*H04W 4/80* (2018.01)
*H04B 1/713* (2011.01)

(52) U.S. Cl.
CPC .............. *H04W 4/80* (2018.02); *H04B 1/713* (2013.01)

(58) Field of Classification Search
CPC .................................. H04W 4/80; H04B 1/713
See application file for complete search history.

(56) References Cited

U.S. PATENT DOCUMENTS

| | | | | |
|---|---|---|---|---|
| 2015/0304803 A1* | 10/2015 | Chen | ................ | H04W 52/0209 455/41.2 |
| 2015/0334488 A1* | 11/2015 | Kim | ..................... | H04W 76/00 381/2 |
| 2016/0278006 A1* | 9/2016 | Lee | ........................ | H04W 12/04 |
| 2016/0286340 A1* | 9/2016 | Zhu | ......................... | H04W 4/80 |
| 2019/0098678 A1* | 3/2019 | Von Dentz | ............. | H04L 69/24 |

\* cited by examiner

*Primary Examiner* — David Bilodeau
(74) *Attorney, Agent, or Firm* — Saile Ackerman LLC; Stephen B. Ackerman

(57) ABSTRACT

A method of communication in a Bluetooth Low Energy (BLE) network comprising a master device and a plurality of slave devices. The method has the steps of: generating a unique identifier parameter comprising a data string having a plurality of bits; assigning to each slave device a unique bit of the unique identifier parameter and a value of the bit representative of active communication; sending from the master device to each slave device a communication which includes the unique identifier parameter; at each slave device, determining the value of the bit assigned to the respective slave device; at each slave device, if the determined value of the bit is representative of active communication, processing the communication, otherwise ignoring the communication.

16 Claims, 5 Drawing Sheets

BLE SYSTEM WITH MULTIPLE TOPOLOGIES AND SLAVE TO SLAVE COMMUNICATION

TECHNICAL FIELD

The present disclosure relates to wireless communication systems. In particular, but not exclusively, the present disclosure relates to Bluetooth Low Energy (BLE) systems which support multiple topologies and slave to slave communication.

BACKGROUND

A popular protocol for wireless connectivity is Bluetooth. A recent version of this is the BLE standard, previously referred to as Bluetooth Smart. Its operation is defined by various standards and specifications which are managed by the Bluetooth Special Interest Group.

The BLE standard defines two device roles at the Link Layer for a connection: the master device and the slave device. A master device can manage multiple simultaneous connections with different slave devices. Each slave device is assigned a unique access address by the master device during connection setup. The access address is 32 bits in length. Thus, a network, called a piconet, can be formed which comprises a master device and multiple slave devices in a point-to-multipoint star topology. Each slave device in the piconet is time synchronized to the clock of the master device. Time synchronization enables the devices to go to sleep in between anchor points of the connection and, when they wake up again, the radios of the devices are synchronized and the data transfer between the master and the slave devices can continue.

Communication is always between a master and a slave device. The BLE standard does not support any direct communication between the slaves. If one slave wants to send a message to another slave, the slave must first send the message to the master and then the master must forward that message to the recipient slave. This requires a complex protocol with high power requirements.

The BLE specification defines a connection model for BLE with a minimum connection interval of 7.5 ms and a maximum connection interval of 4 s. Within the BLE standard, and using the minimum connection interval, two devices cannot connect and exchange data more frequently than every 7.5 ms. Each slave device wakes up at every anchor point of the connection interval and receives a data packet from the master device if one has been sent. The slave device replies to the master device then goes to sleep (to save power) until the next anchor point. The master device has to schedule non-overlapping connection intervals with each slave device. Therefore, the anchor points of each connection between the master and the slave are offset such that they do not overlap in time, for example for 7.5 ms connection intervals, a master device can only schedule connections to 3 slaves, thus allowing 2.5 ms for each connection.

There are a number of disadvantages with such a star topology. The scheduling of connection intervals by the master device can be difficult when several slave devices are using lower values of the connection interval (generally it is very difficult for a master device to schedule more than three connections for a 7.5 ms connection interval). Also, the master device cannot address multiple slaves at the same time since it addresses each slave device separately. This increases power consumption at the master device and interference since the master device must transmit more often.

SUMMARY

It is desirable to provide a BLE network that has multiple or alternative topologies. It is desirable to provide slave to slave communication in a BLE network without violating the BLE standard.

There are many practical applications where slave to slave communication is desirable. For example, for an entertainment device (such as a TV or music system, or a smart phone) wirelessly connected to multiple speakers, a volume change can be performed with a single command from the TV (the master device) to all speakers (the slave devices) at the same time. Or a router (or an LE base unit) may be connected to multiple sensors and time synchronization between sensors can be achieved using a single command from the Router. Or a mobile phone may be connected to multiple toys and the toys can communicate to each other to enhance the gaming experience.

According to a first aspect of the present disclosure there is provided a method of communication in a Bluetooth Low Energy (BLE) network comprising a master device and a plurality of slave devices, the method comprising the steps of:
  generating a unique identifier parameter comprising a data string having a plurality of bits;
  assigning to each slave device a unique bit of the unique identifier parameter and a value of the bit representative of active communication;
  sending from the master device to each slave device a communication which includes the unique identifier parameter;
  at each slave device, determining the value of the bit assigned to the respective slave device;
  at each slave device, if the determined value of the bit is representative of active communication, processing the communication, otherwise ignoring the communication.

The term "active communication" is to be taken to mean that a communication sent from the master device to a particular slave device is intended for that slave device.

Optionally, the method includes assigning to each slave device a common connection interval.

Optionally, the method includes assigning to each slave device a common connection interval having common anchor points.

Optionally, the method includes simultaneously sending from the master device to each slave device the communication which includes the unique identifier parameter.

Optionally, the unique identifier parameter comprises at least a portion of an access address.

Optionally, the method includes sending a communication directly from one slave device to one or more other slave devices.

Optionally, the method includes informing each slave device of the other slave devices in the network.

Optionally, the method includes implementing a first frequency hopping sequence for master to slave communication and a second frequency hopping sequence for slave to slave communication.

Optionally, the method includes assigning a portion of each connection interval as a slave interval for slave to slave communication.

Optionally, the method includes assigning a different slave interval to each of the plurality of slave devices.

Optionally, each slave device communicates with one or more other slave devices using the unique identifier parameter.

According to a second aspect of the present disclosure there is provided a Bluetooth Low Energy (BLE) network comprising a master device and a plurality of slave devices, wherein:

the master device is adapted to:
generate a unique identifier parameter comprising a data string having a plurality of bits;
assign to each slave device a unique bit of the unique identifier parameter and a value of the bit representative of active communication;
send to each slave device a communication which includes the unique identifier parameter, and wherein each slave device is adapted to:
determine the value of the bit assigned to the respective slave device; and
if the value of the bit is representative of active communication, process the communication, otherwise ignore the communication.

It will be appreciated that the BLE network of the second aspect may include features as described for the method of the first aspect in accordance with the understanding of the skilled person.

According to a third aspect of the present disclosure there is provided a method of communication in a Bluetooth Low Energy (BLE) network comprising a master device and a plurality of slave devices, the method comprising the steps of:

assigning to each slave device a common connection interval having common anchor points;
assigning a portion of each connection interval as a slave interval for slave to slave communication, wherein a different slave interval is assigned to each of the plurality of slave devices; and
during the respective slave interval, sending a communication directly from one slave device to one or more other slave devices.

Optionally, the method includes generating a unique identifier parameter comprising a data string having a plurality of bits, and assigning to each slave device a unique bit of the unique identifier parameter and a value of the bit representative of active communication.

Optionally, the method includes, at each slave device, determining the value of the bit assigned to the respective slave device.

Optionally, the method includes, at each slave device, if the value of the bit is representative of active communication, processing the communication, otherwise ignoring the communication.

It will be appreciated that the method of the third aspect may include features as described for the method of the first aspect in accordance with the understanding of the skilled person.

BRIEF DESCRIPTION OF THE DRAWINGS

The disclosure will be described below, by way of example only, with reference to the accompanying drawings, in which.

DESCRIPTION

Figure 1:
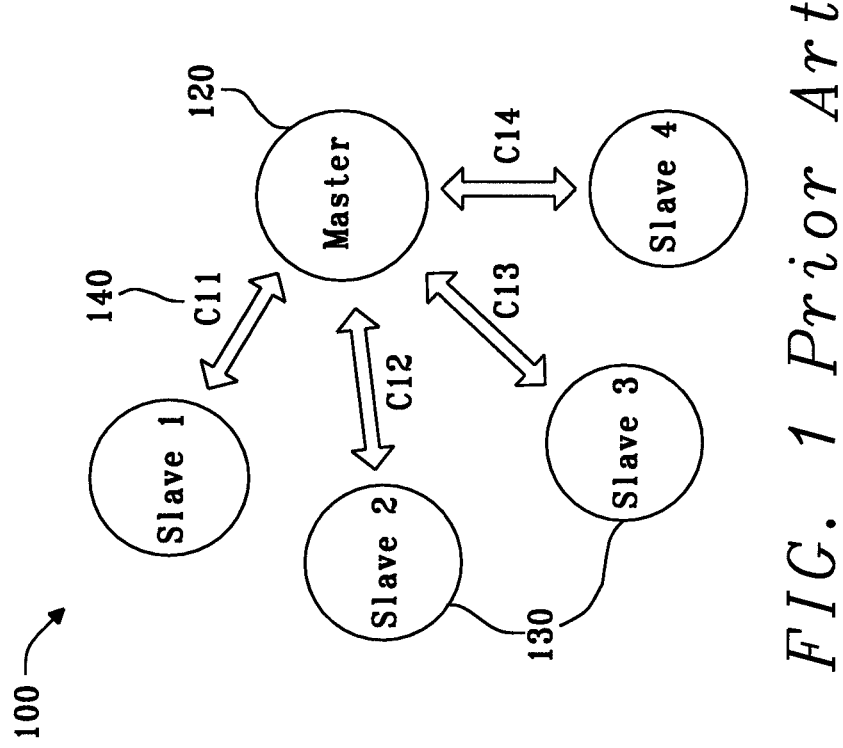
FIG. 1 is a schematic view of a prior art BLE network.

FIG. 1 shows a prior art BLE network 100 which has a star topology.

A BLE device may operate in different modes depending on required functionality. In order to establish a connection, one device has to be in advertising mode (and allow for a connection) and the other device in Initiator mode. The initiator scans for a desirable device-advertising packet and consequently sends a connection request. Once a connection is established, the initiator assumes the role of master device 120 and the advertiser becomes a slave device 130. Slave devices 130 may have only one connection at a time (to the master device 120), while master devices 120 may have multiple connections with different slave devices 130 simultaneously.

When a connection is established, the initiator device (which will become a master device 120) supplies the advertising device (which will become a slave device 130) with a set of critical data defining the channel and timing of the master-slave data exchange. In particular, this data specifies the connection interval parameter 140. The connection interval 140 determines the time between the start of the data packet exchange sequence called connection events.

Figure 2:
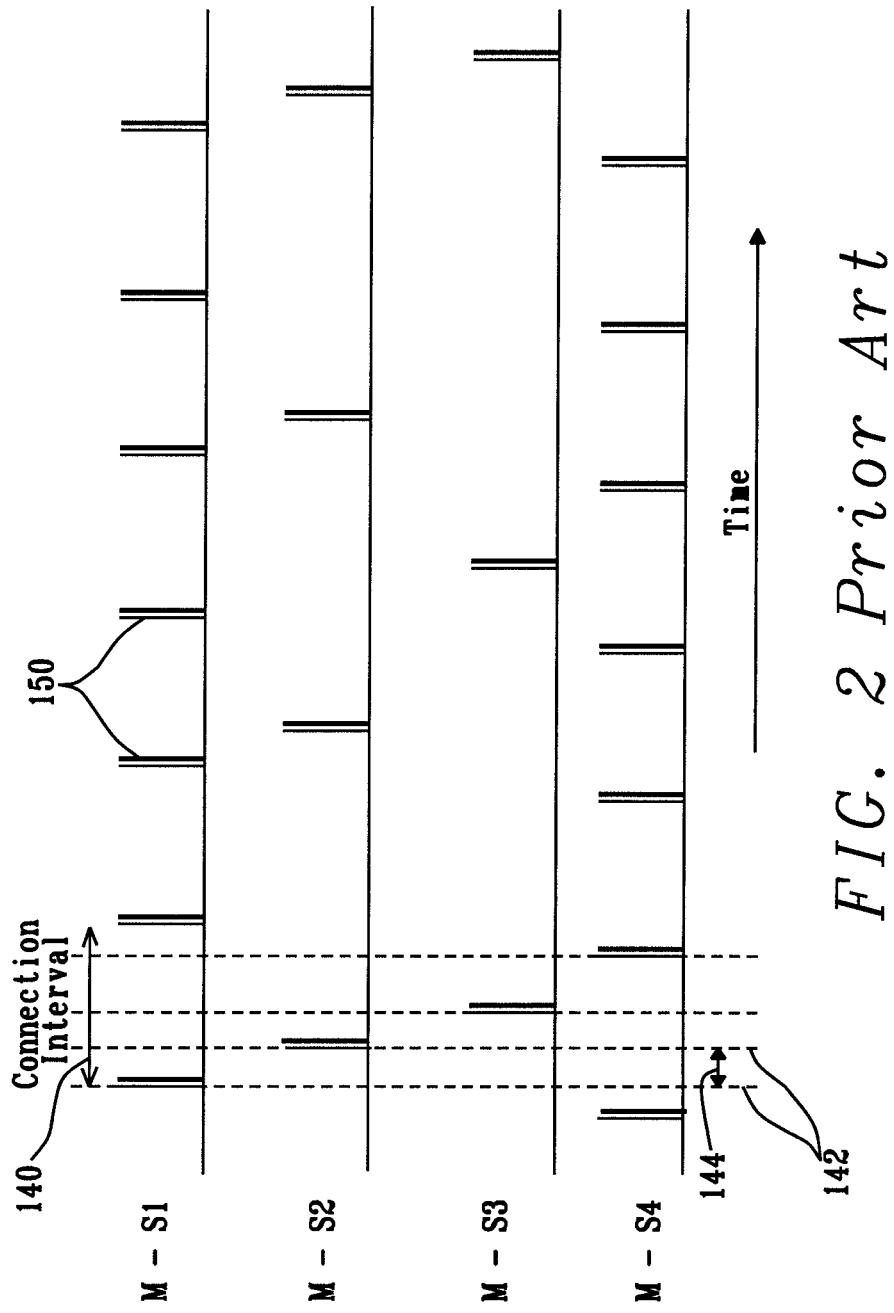
FIG. 2 is a schematic view of the communication timings of the devices in the network of FIG. 1.

During a connection event, the master and slave devices alternate sending and receiving packets 150 until either side stops sending packets. The start of a connection event is called an anchor point 142. At the anchor point 142, a master device 120 starts to transmit a Data Channel PDU to the slave device 130. To avoid interference, the master device 120 communicates with the slave devices 130 sequentially and one at a time. To achieve this, the anchor points 142 for each slave device 130 are offset from each other. Anchor points 142 and offset periods 144 are shown in FIG. 2.

Data packets 150 include an access address used to identify valid communications. This is 32 bits in length and, for each communication, each slave device 130 compares the value given in the communication with the value set by the master device during pairing. If the two values exactly match, the slave device 130 continues to process the communication, otherwise it is ignored.

Figure 3:
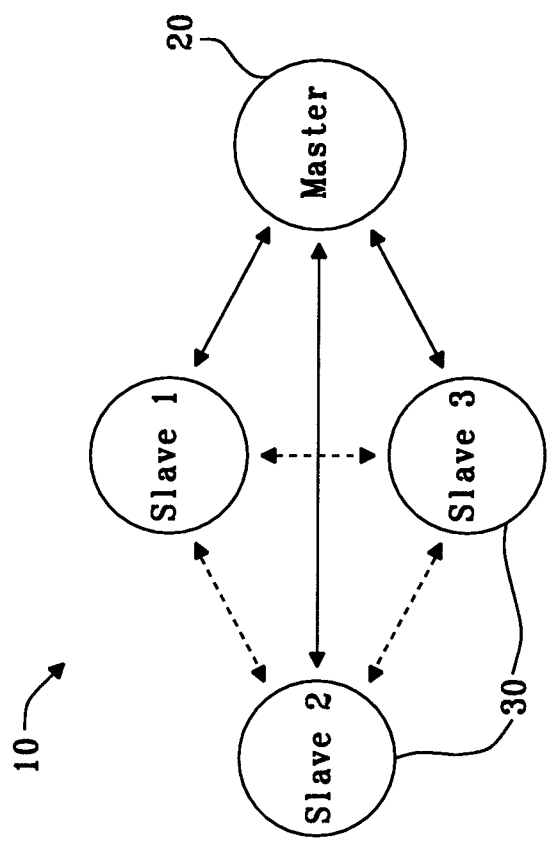
FIG. 3 is a schematic view of BLE network in accordance with the present disclosure.

The present disclosure provides a method of communication using a different topology. This topology allows simultaneous communication from the master device 20 communication to the slave devices 30 in a BLE network 10. The topology also allows slave to slave communication. This is shown in FIG. 3.

As before, a master device 20 is connected to a plurality of slave devices 30. As will be described, the connection to multiple slaves is reliable since all slaves can reliably acknowledge the reception of packets from the master device 20. When pairing, the master device 20 generates a unique identifier parameter in the form of an access address and this is sent to the slave device 30. However, only a portion, such as the first 16 bits, of the access address is used to validate communications. The remaining portion, such as the least significant 16 bits, is used to specify which slave device or devices any particular communication is intended. Each slave device 30 is assigned a unique bit of the remaining portion of the access address. Thus, if the unique bit is a '1' in a sent communication then the communication is intended for that particular slave device 30 (in other embodiments, a '0' could be used instead).

When a communication from the master device 20 is received, each slave device 30 first compares the first portion of the access address with the version it was sent during pairing. If there is a match then the communication is treated as valid. The slave device 30 then determines the value of the bit of the remaining portion of the access address assigned to the respective slave device 30. If the determined value of the bit is representative of active communication, the slave device 30 proceeds to process the communication. If not, the communication is ignored.

Figure 4:
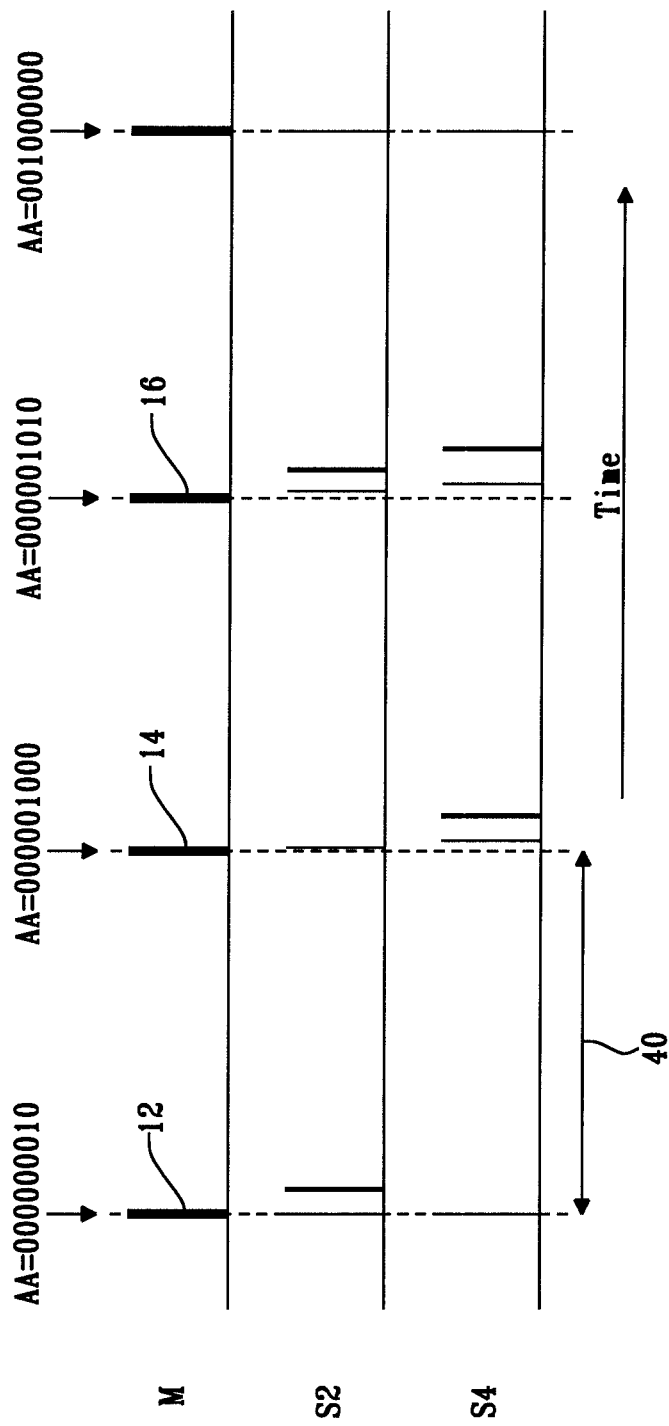
FIG. 4 is a schematic view of the communication timings of the devices in the network of FIG. 3.

FIG. 4 shows the timing of different communications sent from the master device 20. A first communication 12 is sent which includes an access address in which the remaining portion is '000000010'. Only the second last bit is a '1' and this signifies that the communication 12 is only intended for the second slave device 30 in the network 10. As can be seen in the figure, only the second slave device 30 responds to the communication 12 within the same connection interval.

A second communication 14 is later sent which includes in the remaining portion '000001000'. This signifies that the communication 14 is only intended for the fourth slave device 30 in the network 10 and so only the second slave device 30 responds.

A third communication 16 includes in the remaining portion '000001010. This signifies that the communication 16 is intended for both the second and the fourth slave devices 30 and so both slave device 30 respond. Each slave device 30 is aware of which other slave devices 30 are in the network 10. Each slave device 30 is also aware of who is intended to receive each communication. For this third communication 16, the fourth slave device 30 is aware that it is also intended for the second slave device 30 and so, to avoid interference, the fourth slave device 30 waits a small period of time before sending its response.

The method also includes assigning to each slave device a common connection interval 40. In other words, the connection interval used for each slave device 30 has the same duration. It also has common anchor points. No offset is used and the master device 20 sends its communications to all the slave devices 30 simultaneously.

Figure 5:
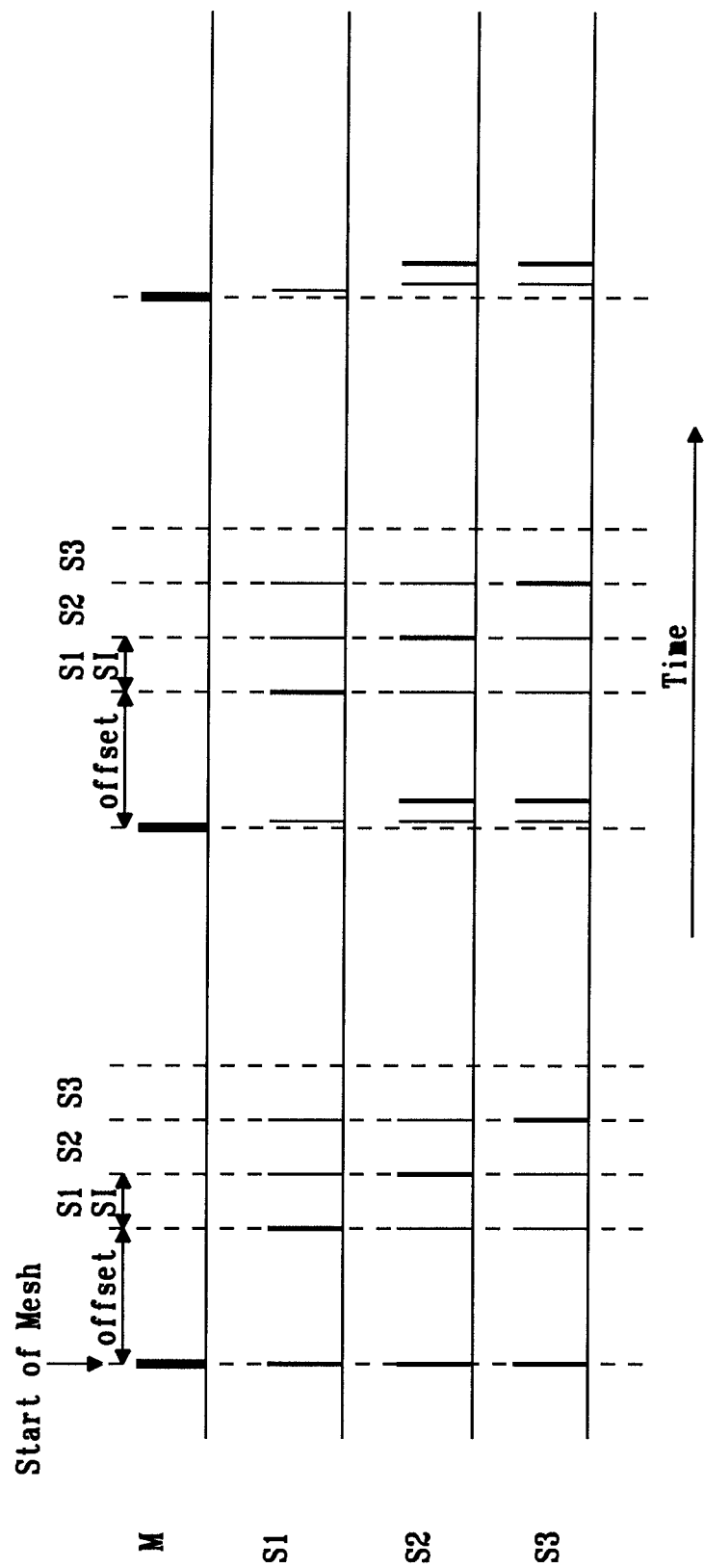
FIG. 5 is another schematic view of the communication timings of the devices in the network of FIG. 3.

The method also allows sending communication directly from one slave device 30 to one or more other slave devices 30. An earlier portion of each connection interval 40 is reserved for communication between the master device 20 and the slave devices 30. A later portion of each connection interval 40 is assigned as a slave interval 50 for slave to slave communication. This is shown in FIG. 5.

A different slave interval is assigned to each of the slave devices 30. In FIG. 5, these are designated S1 to S3. For example, if the second slave device 30 wishes to communicate with one or more other slave devices 30, it does so during slave interval S2. The slave devices 30 communicates with each other using the same technique as the master device 20, that is using the appropriate unique bit of the access address.

To assist in avoiding interference, the method includes implementing a first frequency hopping sequence for master to slave communication and a second frequency hopping sequence for slave to slave communication.

Various modifications and improvements can be made to the above without departing from the scope of the disclosure.

What is claimed is:

1. A method of communication in a Bluetooth Low Energy (BLE) network comprising a master device and a plurality of slave devices, the method comprising the steps of:
    generating a unique identifier parameter comprising a data string having a plurality of bits;
    assigning to each slave device a unique bit of the unique identifier parameter and a value of the bit representative of active communication;
    sending from the master device to each slave device a communication which includes the unique identifier parameter;
    at each slave device, determining the value of the bit assigned to the respective slave device;
    at each slave device, if the determined value of the bit is representative of active communication, processing the communication, otherwise ignoring the communication.

2. The method as claimed in claim 1, including assigning to each slave device a common connection interval.

3. The method as claimed in claim 2, including assigning to each slave device a common connection interval having common anchor points.

4. The method as claimed in claim 1, including simultaneously sending from the master device to each slave device the communication which includes the unique identifier parameter.

5. The method as claimed in claim 1, wherein the unique identifier parameter comprises at least a portion of an access address.

6. The method as claimed in claim 1, including sending a communication directly from one slave device to one or more other slave devices.

7. The method as claimed in claim 1, including informing each slave device of the other slave devices in the network.

8. The method as claimed in claim 6, including implementing a first frequency hopping sequence for master to slave communication and a second frequency hopping sequence for slave to slave communication.

9. The method as claimed in claim 6, including assigning a portion of each connection interval as a slave interval for slave to slave communication.

10. The method as claimed in claim 9, including assigning a different slave interval to each of the plurality of slave devices.

11. The method as claimed in claim 6, wherein each slave device communicates with one or more other slave devices using the unique identifier parameter.

12. A Bluetooth Low Energy (BLE) network comprising a master device and a plurality of slave devices, wherein:
    the master device is adapted to:
        generate a unique identifier parameter comprising a data string having a plurality of bits;
        assign to each slave device a unique bit of the unique identifier parameter and a value of the bit representative of active communication;
        send to each slave device a communication which includes the unique identifier parameter,
    and wherein each slave device is adapted to:
        determine the value of the bit assigned to the respective slave device; and
        if the value of the bit is representative of active communication, process the communication, otherwise ignore the communication.

13. A method of communication in a Bluetooth Low Energy (BLE) network comprising a master device and a plurality of slave devices, the method comprising the steps of:
- assigning to each slave device a common connection interval having common anchor points;
- assigning a portion of each connection interval as a slave interval for slave to slave communication, wherein a different slave interval is assigned to each of the plurality of slave devices; and
- during the respective slave interval, sending a communication directly from one slave device to one or more other slave devices.

14. The method as claimed in claim 13, including generating a unique identifier parameter comprising a data string having a plurality of bits, and assigning to each slave device a unique bit of the unique identifier parameter and a value of the bit representative of active communication.

15. The method as claimed in claim 14, including, at each slave device, determining the value of the bit assigned to the respective slave device.

16. The method as claimed in claim 15, including, at each slave device, if the value of the bit is representative of active communication, processing the communication, otherwise ignoring the communication.

* * * * *